(12) United States Patent
Hanna et al.

(10) Patent No.: US 9,868,506 B2
(45) Date of Patent: Jan. 16, 2018

(54) RAIL SYSTEM FOR SEAT ASSEMBLY IN AN AIRCRAFT

(71) Applicant: Airbus Operations GmbH, Hamburg (DE)

(72) Inventors: Klaus Hanna, Hamburg (DE); Daniele Bruno, Hamburg (DE); Rainer Kriewall, Glinde (DE)

(73) Assignee: Airbus Operations GmbH, Hamburg (DE)

( * ) Notice: Subject to any disclaimer, the term of this patent is extended or adjusted under 35 U.S.C. 154(b) by 17 days.

(21) Appl. No.: 14/613,731

(22) Filed: Feb. 4, 2015

(65) Prior Publication Data
US 2015/0225066 A1  Aug. 13, 2015

(30) Foreign Application Priority Data
Feb. 7, 2014  (DE) .................. 10 2014 202 287

(51) Int. Cl.
| B64C 25/42 | (2006.01) |
| B64C 1/20 | (2006.01) |
| H02G 3/38 | (2006.01) |
| H02G 3/04 | (2006.01) |

(52) U.S. Cl.
CPC .............. *B64C 1/20* (2013.01); *H02G 3/385* (2013.01); *H02G 3/0418* (2013.01); *H02G 3/0437* (2013.01)

(58) Field of Classification Search
CPC ...... H02G 3/0437; H02G 3/0418; B64C 1/18; B64C 1/20; B64C 1/22; B64C 1/24; B64D 9/00; B64D 6401/20; B64D 11/06; H02J 5/005; B63B 17/00; B61D 17/00; B64G 1/42; H04B 5/0037

USPC ....................................................... 244/122 R
See application file for complete search history.

(56) References Cited

U.S. PATENT DOCUMENTS

| 3,381,921 A | 5/1968 | McDonough |
| 3,578,274 A | 5/1971 | Ginn |
| 3,800,713 A | 4/1974 | Nordstrom |
| 4,773,791 A | 9/1988 | Hartkorn |
| 4,936,527 A | 6/1990 | Gorges |

(Continued)

FOREIGN PATENT DOCUMENTS

| DE | 19923489 | 11/2000 | |
| DE | 19923489 A1 * | 11/2000 | ............... B64C 1/20 |
| DE | 10 2011 111 864 | 2/2013 | |

OTHER PUBLICATIONS

English Translation of DE19923489.*

(Continued)

*Primary Examiner* — Assres H Woldemaryam
(74) *Attorney, Agent, or Firm* — Jenkins, Wilson, Taylor & Hunt, P.A.

(57) ABSTRACT

A rail system, in particular for assembling or fastening seats in an aircraft, includes an assembly rail, in particular a seat rail for assembling or fastening a seat, a first panel, in particular a first floor panel for arrangement next to and substantially in parallel with the assembly rail, and at least one cover element which is movable between a first position in or on the first panel and a second position for covering the assembly rail, wherein an upper surface of the at least one cover element in the second position is located substantially in a plane with a surface of the first panel.

16 Claims, 4 Drawing Sheets

(56) References Cited

U.S. PATENT DOCUMENTS

| | | | |
|---|---|---|---|
| 5,131,606 A | 7/1992 | Nordstrom | |
| 6,039,288 A | 3/2000 | Huber | |
| 6,302,358 B1 | 10/2001 | Emsters | |
| 6,343,908 B1* | 2/2002 | Oudsten | A61G 3/061 |
| | | | 414/537 |
| 6,875,916 B2 | 4/2005 | Winkelbach | |
| 7,784,799 B2 | 8/2010 | Etling | |
| 7,926,762 B2 | 4/2011 | Oetken | |
| 9,238,504 B2 | 1/2016 | Huber | |
| 2003/0106962 A1* | 6/2003 | Smallhorn | B64C 1/18 |
| | | | 244/118.5 |
| 2004/0100117 A1* | 5/2004 | Rhodes | B60N 2/3013 |
| | | | 296/66 |
| 2005/0140098 A1 | 6/2005 | Etling | |
| 2006/0075934 A1* | 4/2006 | Ram | B60N 3/004 |
| | | | 108/44 |
| 2007/0089746 A1* | 4/2007 | Mitchell | A62B 99/00 |
| | | | 128/205.15 |
| 2012/0312920 A1* | 12/2012 | Huber | B64D 9/003 |
| | | | 244/118.1 |
| 2013/0048785 A1* | 2/2013 | Grosse-Plankermann | B64C 1/18 |
| | | | 244/119 |
| 2013/0278002 A1* | 10/2013 | Preisler | B32B 3/12 |
| | | | 296/37.5 |
| 2013/0278008 A1* | 10/2013 | Preisler | B60R 13/013 |
| | | | 296/97.23 |
| 2013/0278009 A1* | 10/2013 | Preisler | B60R 13/0275 |
| | | | 296/97.23 |
| 2015/0061380 A1* | 3/2015 | Schomacker | B64C 1/18 |
| | | | 307/9.1 |
| 2015/0225067 A1* | 8/2015 | Hanna | B64C 1/20 |
| | | | 244/122 R |

OTHER PUBLICATIONS

German Search Report for Application No. 10 2014 202 288.6 dated Aug. 26, 2014.
German Search Report for Application No. 10 2014 202 287.8 dated Sep. 2, 2014.
Non-Final Office Action for U.S. Appl. No. 14/613,806 dated Jul. 5, 2016.
Final Office Action for U.S. Appl. No. 14/613,806 dated Mar. 24, 2017.

* cited by examiner

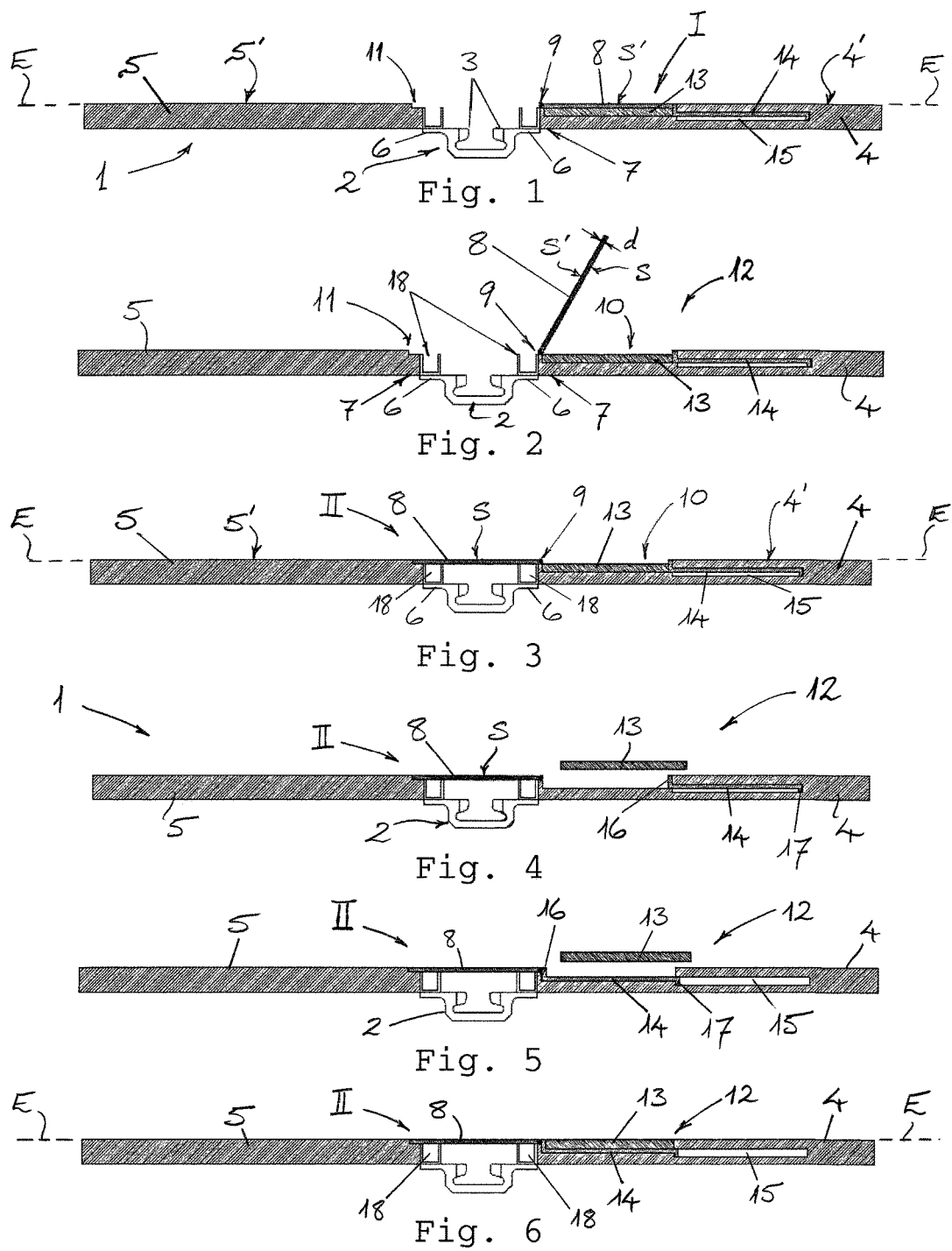

RAIL SYSTEM FOR SEAT ASSEMBLY IN AN AIRCRAFT

CROSS-REFERENCE TO RELATED APPLICATION

This application claims priority to DE 10 2014 202 287.8 filed Feb. 7, 2014, the entire disclosure of which is incorporated by reference herein.

TECHNICAL FIELD

The subject matter disclosed herein relates to a rail system, in particular for assembling or fastening objects in a vehicle.

Here, the rail system according to the subject matter disclosed herein has been configured in particular for use in the assembly or fastening of seats in an aircraft. However, it is also possible for the system to be used in other ways, for example in the assembly or fastening of freight containers or palettes during transportation in a vehicle.

BACKGROUND

When seats are assembled or fastened in an aircraft by the conventional method, assembly rails (so-called seat rails) are used on the deck of the fuselage structure. The seat rails run in the longitudinal direction of the aircraft and have a plurality of connection points or fastening points at regular intervals along the rail (for example, at every inch). The connection points or fastening points thus allow a high level of flexibility in the determination and configuration of the seating space between the rows of seats. The seat rails are fixed approximately in parallel with one another on the deck and the seats can then be fastened closer together or further apart on the rails in the longitudinal direction of the aircraft at the discretion of the airline company.

However, since the seat rails are usually fixed on the deck, they can create an obstacle on the floor. Although such obstacles can be overcome using appropriately configured floor coverings, solutions of this type can also be associated with high costs. However, it is then often impossible to change the seating arrangement quickly, because the floor coverings must firstly be removed or dismantled.

SUMMARY

Therefore, an object of the subject matter disclosed herein is to configure a new rail system for assembling or fastening seats in an aircraft, in which the seat rails do not create an obstacle on the floor and in which it is possible to reconfigure the seating arrangement in a relatively fast and/or uncomplicated manner. Furthermore, if anything the rail system should have a reliable and economical construction.

According to an aspect of the subject matter disclosed herein, a rail system, in particular for assembling or fastening seats in a vehicle is provided, the rail system comprising:

- an assembly rail, in particular a seat rail for assembling or fastening a seat or a plurality of seats;
- a first panel, in particular a first floor panel for arrangement next to and substantially in parallel with the assembly rail; and
- at least one cover element which is movable between a first position in or on the first panel and a second position for covering the assembly rail, a surface of the at least one cover element in the second position being located substantially in a plane with a surface of the first panel.

In this manner, the subject matter disclosed herein provides a rail system, by which a substantially flat or planar floor surface can be provided in spite of the presence of an assembly rail. The assembly rail or seat rail is preferably offset under the plane of the surface of the first panel, so that the at least one cover element can extend in the plane of the surface of the first panel over the assembly rail. For this purpose, the at least one cover element can be configured as a substantially flat and rigid or semi-rigid element and is preferably configured as a flap, a tab, a plate or a sheet.

In one embodiment of the subject matter disclosed herein, the at least one cover element is positioned on the first panel or on the first floor panel and is optionally also fastened thereto. In this respect, in the first position, the at least one cover element can be located or received in a recess in or on the first panel. In a specific embodiment of the subject matter disclosed herein, in the first position, an upper surface of the at least one cover element can thus be located substantially in a plane with the surface of the first panel. The rail system according to the subject matter disclosed herein can thereby ensure that when the cover element is in the first position and also when it is in the second position, it is located or it remains in the plane of the surface of the first panel.

In a further embodiment of the subject matter disclosed herein, in the second position, the upper surface of the cover element merges substantially smoothly into the surface of the first panel. In a specific embodiment, for this purpose the first panel has a levelling device for levelling the surface of the panel or for filling a recess in the panel, particularly when the at least one cover element is in the second position. Thus, the rail system according to the subject matter disclosed herein can also ensure that unevennesses in the surface of the first panel or floor panel due to a recess for the at least one cover element are evened out so that a substantially continuously flat or planar floor surface can be provided.

In a further embodiment of the subject matter disclosed herein, the levelling device has a filler element which is movable from a position which is inactive, recessed or inserted in the first panel into a filling position when the cover element is in the second position. In this filling position, an upper surface of the filler element is substantially in a plane with the surface of the first panel. The filler element may be configured such that it can be removed from and reintroduced into the position which is inactive, recessed or inserted in the first panel. The levelling device can also comprise a sliding piece which is configured for lateral displacement such that the sliding piece is displaceable between a retracted position, next to the filler element located in the inactive, recessed or inserted position, and an extracted position. This extracted position can be, for example under the filler element which is in the filling position. In this manner, the sliding piece can lift or move the filler element into the filling position. If the sliding piece has the same dimensions as a recess in the upper side of the first panel, the sliding piece can level the recess by its lateral displacement and, with the filler element, it can provide a flat or planar surface.

In a further embodiment of the subject matter disclosed herein, the at least one cover element can be pivoted between the first position and the second position, preferably in or through an angular range of approximately 180°. For this purpose, the at least one cover element may be attached by a hinge to the first panel or to the rail. In an alternative embodiment, the at least one cover element can be displaceable between the first position and the second position.

In a further embodiment of the subject matter disclosed herein, the rail system has a holder mechanism, for example in the form of a magnet mechanism or a catch mechanism or locking mechanism by which the at least one cover element is held in at least one of the first and second positions. Furthermore, the at least one cover element can be pretensioned into at least one of the first and second positions, preferably by a spring or by a spring element.

In a further embodiment of the subject matter disclosed herein, the rail system has a plurality of cover elements which are arranged in a row next to one another along and next to or on the assembly rail. For this purpose, the assembly rail has a plurality of connection points or fastening points arranged at intervals, and each of the cover elements is arranged such that in the second position, it covers at least one connection point or at least one fastening point. In this respect, the connection points or fastening points can be covered and/or held open individually or in groups.

In a further embodiment of the subject matter disclosed herein, the rail system comprises a second panel, for example a second floor panel for arrangement next to and approximately in parallel with both the assembly rail and the first panel on one side of the assembly rail, opposite the first panel, such that a surface of the second panel is substantially in the plane with the surface of the first panel. In this manner, the cover elements can span the assembly rail between the first and second panels or floor panels.

In a further embodiment of the subject matter disclosed herein, the assembly rail has a projection, for example a flange for attaching or supporting an edge region or peripheral region of the first panel. In this respect, the at least one cover element is attached to the edge region or peripheral region of the first panel. Similarly, the assembly rail can have a further projection, for example a further flange for attaching or supporting an edge region or peripheral region of the second panel. The seat rail or assembly rail also comprises at least one duct for guiding a cabling system, the at least one cover element covering this at least one duct in the second position.

According to a further aspect of the subject matter disclosed herein, a rail system, in particular for assembling or fastening seats in an aircraft is provided, comprising:
 an assembly rail, in particular a seat rail for assembling or fastening a seat or a plurality of seats;
 a first panel, in particular a first floor panel for arrangement next to and approximately in parallel with the assembly rail; and
 at least one cover element which is movable, preferably from the first panel, for covering the assembly rail, and which is preferably provided in or on the first panel; and
 a levelling device for levelling the surface of the first panel, for example for levelling a recess in the first panel when the at least one cover element covers the assembly rail.

According to a further embodiment of the subject matter disclosed herein, a vehicle, in particular an aircraft or spacecraft is provided which comprises a deck structure or fuselage structure having a rail system according to the subject matter disclosed herein, in particular for fastening or assembling seats.

The configurations and developments of the subject matter disclosed herein can be combined together in any desired, sensible manner. Further possible configurations and implementations of the subject matter disclosed herein also include not explicitly mentioned combinations of features of the disclosure described previously or described in the following with reference to the embodiments. In particular, a person skilled in the art will also add individual aspects as improvements or additions to the respective basic form of the subject matter disclosed herein.

BRIEF DESCRIPTION OF THE DRAWINGS

In the following, the subject matter disclosed herein will be described in more detail on the basis of the embodiments described in the figures or drawings, in which:
FIG. 1 is a cross-sectional view of a rail system according to an embodiment of the subject matter disclosed herein with a cover element in the first position;
FIG. 2 is a cross-sectional view of the rail system in FIG. 1 with the cover element moving into the second position;
FIG. 3 is a cross-sectional view of the rail system in FIG. 1 with the cover element in the second position;
FIG. 4 is a cross-sectional view of the rail system in FIG. 1 with the filler element removed from the inactive, recessed position;
FIG. 5 is a cross-sectional view of the rail system in FIG. 1 with a slider element moved out of a retracted position into an extracted position;
FIG. 6 is a cross-sectional view of the rail system in FIG. 1 with the filler element in a filling position.

DETAILED DESCRIPTION

Figure 7:
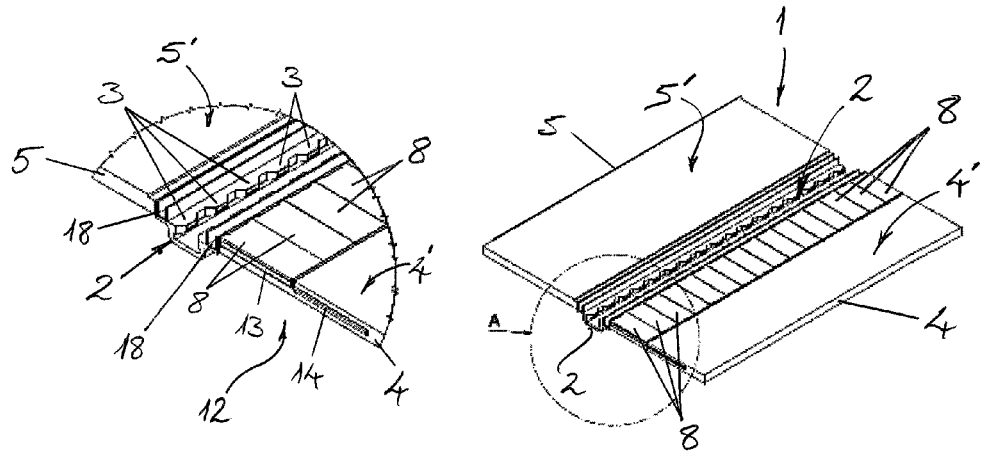
FIG. 7 is a perspective view of the rail system in FIG. 1 with detailed view "A"
Figure 8:
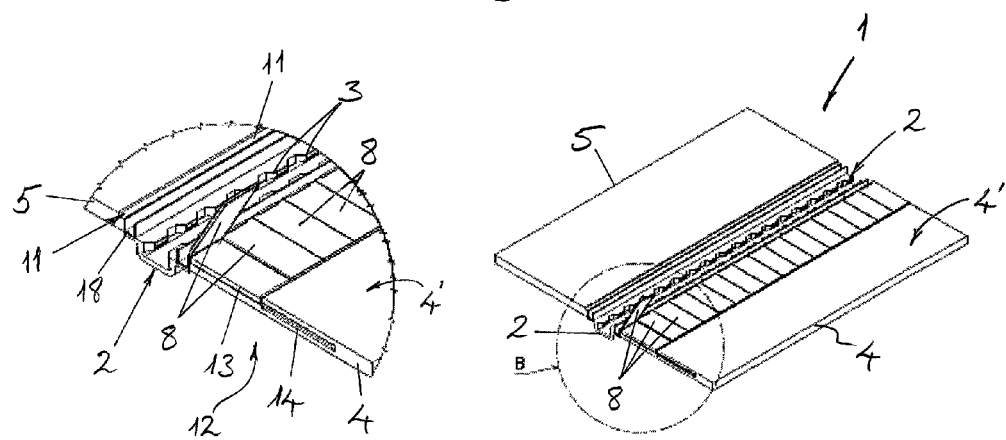
FIG. 8 is a perspective view of the rail system in FIG. 2 with detailed view "B"

The accompanying figures or drawings are to provide further understanding of the preferred embodiments of the subject matter disclosed herein. They illustrate an embodiment and, together with the description, serve to explain principles and concepts of the subject matter disclosed herein. Other embodiments and many of the mentioned advantages are revealed with regard to the figures or drawings. The elements of the figures or drawings have not necessarily been shown true-to-scale relative to one another.

FIGS. 1 to 6 are cross-sectional views (i.e. views transverse to the longitudinal direction of the rail) of a rail system 1 for assembling or fastening seats in an aircraft according to an embodiment of the subject matter disclosed herein, in different operating stages. This rail system 1 is also shown in perspective views in FIGS. 7 to 12 which respectively correspond to FIGS. 1 to 6. Therefore, this embodiment of the rail system 1 according to the subject matter disclosed herein is described in the following with reference to the respective FIGS. 1 to 6 and FIGS. 7 to 12.

The rail system 1 has an assembly rail 2, here in the form of an elongate seat rail, for fastening one or more passenger seats (not shown). The seat rail 2 is preferably configured as a profile element with an upwardly open cross section and with a plurality of connection points or fastening points 3 arranged at regular intervals along the length of the rail. Thus, corresponding connection elements can be introduced into the upwardly open profile of the rail seat 2 on the supporting frame of the passenger seats and they can be positioned on and fastened to the desired connection points or fastening points 3. The seat rail 2 typically consists of a robust material, preferably an aluminium alloy.

The rail system 1 also comprises a first floor panel 4 which is arranged next to and substantially in parallel with the seat rail 2 on one side of the seat rail 2, and also a second floor panel 5 which is also arranged next to and substantially in parallel with the seat rail 2 on the other side of the rail 2. In this connection, the seat rail 2 comprises two laterally outwardly running flanges 6 on opposite sides of the rail profile and each flange is used to attach or support an edge region or peripheral region 7 of the respective floor panels 4, 5. The floor panels 4, 5 are preferably produced from a composite material, such as fibre-reinforced plastics material (CFRP or GFRP). The dimensions of the floor panels 4, 5 and the arrangement thereof on the seat rail 2 are selected such that a surface 4' of the first panel 4 is substantially positioned in a plane E with a surface 5' of the second panel 5. The seat rail itself runs below the plane E.

Figure 9:
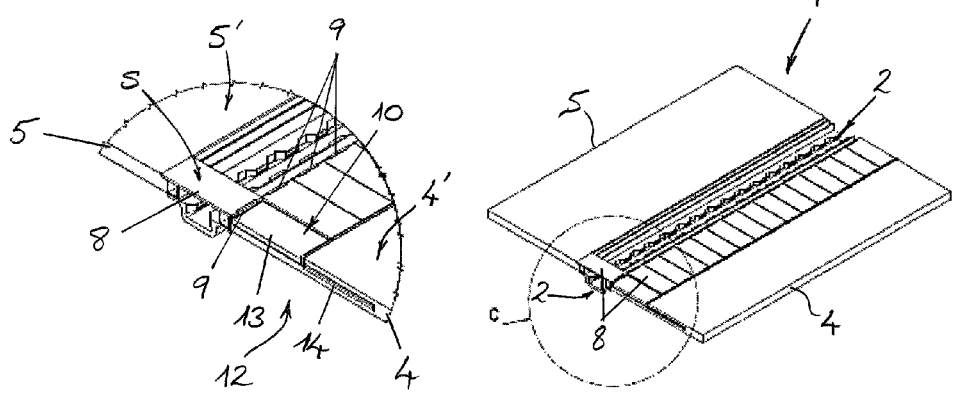
FIG. 9 is a perspective view of the rail system in FIG. 3 with detailed view "C"

As can be seen in FIGS. 7-12, the rail system 1 also has a plurality of rectangular cover elements 8 which are arranged in a row next to one another along the seat rail 2 on the edge region or peripheral region 7 of the first panel 4 and are attached such that they can pivot thereon. This pivotable connection of the cover elements 8 can be clearly seen in FIGS. 2, 8 and 9. In this respect, each cover element 8 is provided as a rectangular flap which is mounted rotatably by a hinge 9 on the peripheral region 7 of the first floor panel 4. Thus, this flap 8 can pivot to move through an angle of approximately 180° between a first position I in or on the first floor panel 4 (as shown in FIGS. 1 and 7) and a second position II in which the flap 8 extends over the seat rail 2 and covers the rail (as shown in FIGS. 3 and 9).

Referring now to FIGS. 1 and 7, an upper surface S of the cover element 8 is located substantially in the plane E of the surface 4' of the first floor panel 4 when the cover element 8 is in the first position I. This is achieved in that, in the first position I, the cover element 8 is located in a small recess or depression 10 in the upper side of the first floor panel 4. This recess or depression 10 can be seen particularly clearly in FIGS. 2 and 3 and in FIGS. 8 and 9. Similarly, an upper surface S' of the cover element 8 is also located substantially in this plane E of the first and second floor panels 4, 5 when the cover element 8 is in the second position II, as shown in FIGS. 3 to 6 and 9 to 12. For this purpose, a small recess or depression 11 is provided in the second floor panel 5 corresponding to a height or thickness d of the cover element 8, in which recess or depression 11 the flap 8 is received in the second position II.

As can be seen in FIGS. 2 and 3 and FIGS. 8 and 9, an unevenness arises in the region of the recess or depression 10 in the surface 4' of the first floor panel 4 when the cover element 8 is pivoted into the second position II. For this, the rail system 1 comprises a levelling device 12 for levelling this surface 4' of the first floor panel 4 when the cover element 8 covers the seat rail 2. In this embodiment, the levelling device 12 has a filler element 13 and a sliding piece 14. In FIGS. 1 to 4, the filler element 13 is in an inactive, recessed position in the first floor panel 4 under the recess or depression 10. However, the sliding piece 14 is located next to or on the side of the filler element 13 in a recess or longitudinal slot 15 in the first floor panel 4. The mode of operation of this levelling device 12 will now be described in more detail with reference to FIG. 4-6 and FIGS. 10-12.

Figure 10:
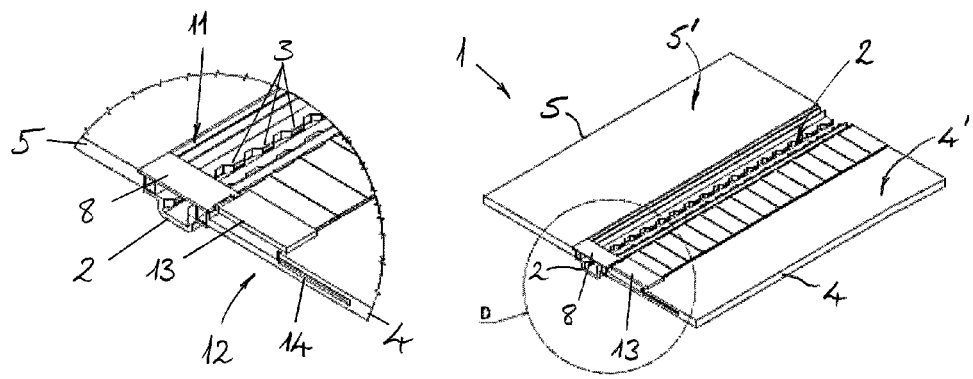
FIG. 10 is a perspective view of the rail system in FIG. 4 with detailed view "D"
Figure 11:
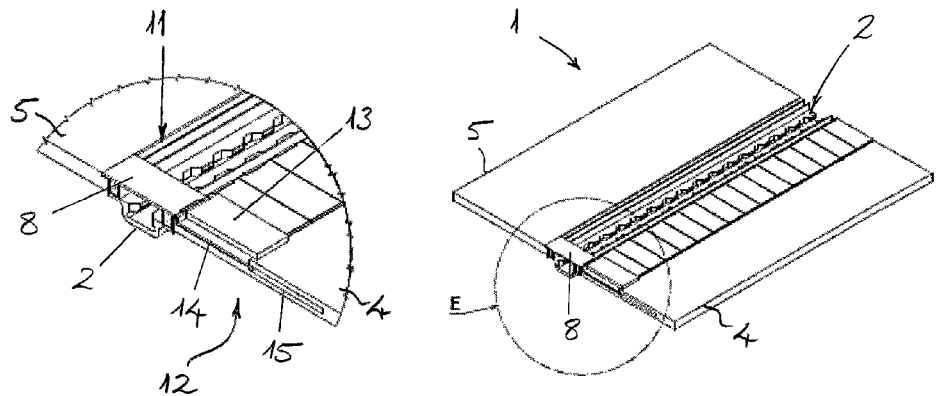
FIG. 11 is a perspective view of the rail system in FIG. 5 with detailed view "E"
Figure 12:
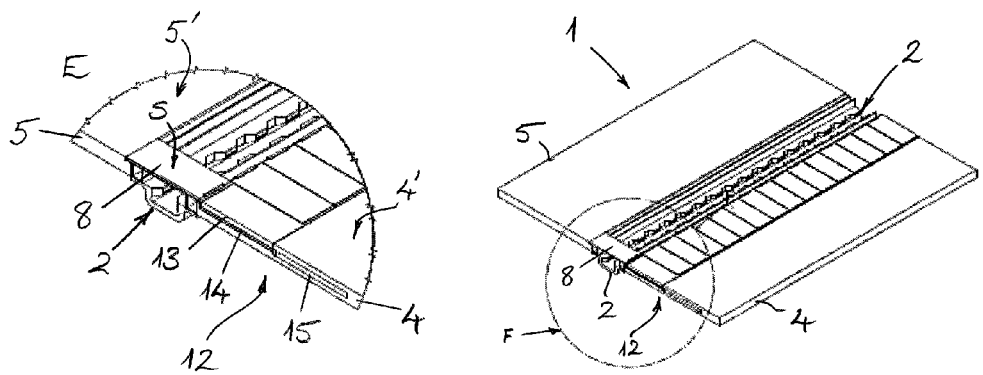
FIG. 12 is a perspective view of the rail system in FIG. 6 with detailed view "F"

As can be seen in FIGS. 4 and 10, the filler element 13 can be removed from the inactive, recessed position in the first panel 4 when the cover element or flap 8 is pivoted into the second position II. When the filler element 13 is removed, the sliding piece 14 can then be extracted sideways or laterally from the retracted position in the recess or groove 15 and can be moved into the former position of the filler element 13. With reference to FIGS. 4 and 5, the sliding piece 14 has a small upright or upwardly bent projection 16, by which a user can grasp the sliding piece 14 with his finger and can displace it laterally in the direction of the seat rail 2. This projection 16 forms a stop for restricting this displacement. At the other end of the sliding piece 14 is a downwards or downwardly bent projection 17 which also forms a stop in both laterally displaced directions against a respective end of the recess or groove 15, as shown in FIGS. 5 and 11. Since the sliding piece 14 has approximately the same dimensions (length and thickness) as the cover element 8, the recess or depression 10 can be evened out by the lateral displacement of the sliding piece 14. Thus, the recess or depression 10 in the surface 4' of the first floor panel 4 can then be filled by re-introducing the filler element 13, as shown in FIGS. 6 and 12. This means that the recess or depression 10 in the upper side of the first floor panel 4 is then filled with the filler element 13 so that the upper surface of the filler element 13 is located approximately in the plane E of the surface of the first floor panel 4, more specifically it merges substantially smoothly into the upper surface S' of the cover element 8. Since, on the other hand, the cover element 8 is in the plane with the surface 5' of the second floor panel 5 (also substantially smoothly), a substantially continuously flat or planar surface is thereby produced above the seat rail 2 between the two floor panels 4, 5.

Referring to FIGS. 1 to 6, the seat rail 2 has two ducts 18 which are each configured to guide a cable system. Each of the cover elements 8 extends over the ducts 18 in the second position II and also covers them. Although not shown, the rail system 1 according to the subject matter disclosed herein can also comprise a holder mechanism by which each cover element 8 is held in the second position II. For this purpose, magnets for example can be provided on the flap 8 and/or in the depression 11 to hold the flap 8 in the plane E in the depression 11. As an alternative or in addition, the depression 11 could have a catch mechanism or locking mechanism by which for example a free edge of the cover element 8 catches or locks in the second position II. Similarly, a corresponding holder mechanism could also be provided in the depression 10 to hold each cover element 8 in the first position I. As an alternative or in addition, each cover element 8 could be pretensioned into the first position I, for example by a spring in the respective hinge 9.

As already mentioned with reference to FIGS. 7-12, the rail system 1 has a plurality of cover elements 8 which are arranged in a row next to one another along the rail 2 on the first floor panel 4. Each of the cover elements 8 or each of the flaps 8 corresponds to one of the connection points or fastening points 3 along the rail 2. Thus, any of the connection points or fastening points 3 which are not required for fastening the passenger seats can be covered by the respective cover elements 8 in the second position II—more specifically in a manner which produces a flat or planar floor and which substantially conceals the seat rail 2. Furthermore, the rail system 1 according to the subject matter disclosed herein allows for a fast adjustment of the passenger seats, which have already been assembled, by opening the directly adjacent cover elements 8 without having to remove the floor panels 4, 5.

Figure 13:
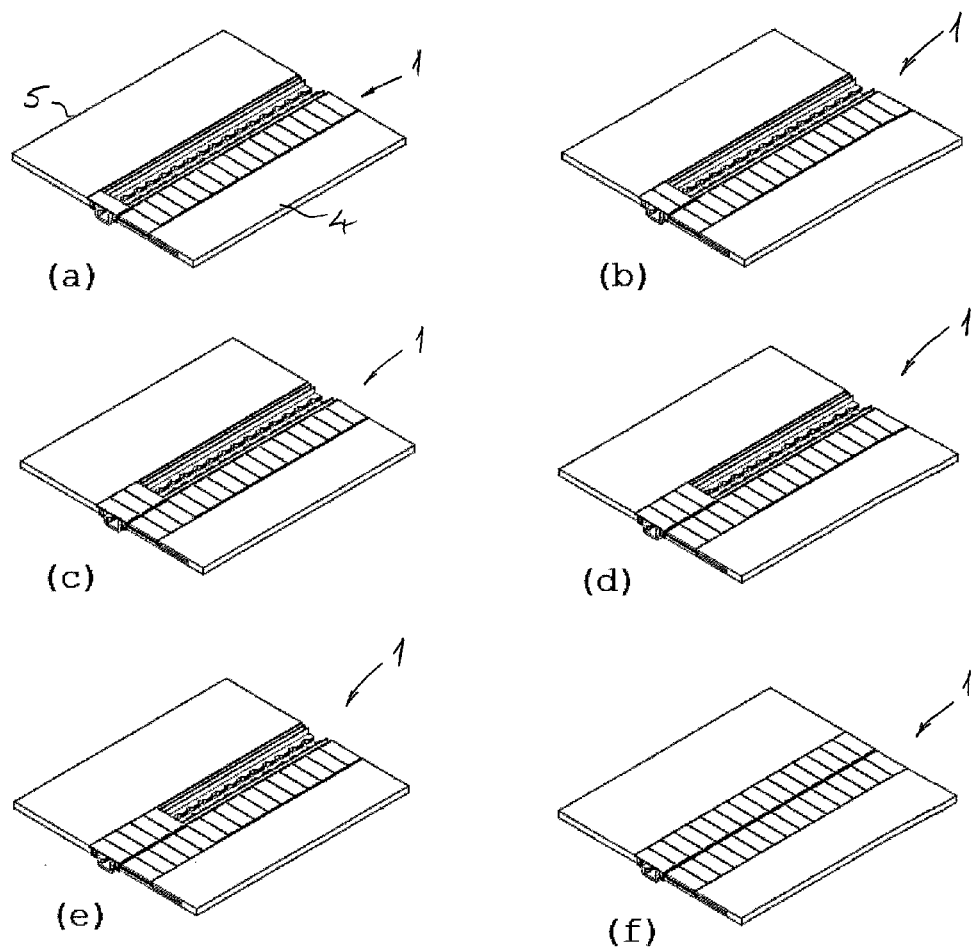
FIG. 13 is a perspective view of the rail system in FIG. 1 shown in (a) to (f) with an increasing number of the cover elements in the second, closed position.

In the process sequence (a)-(f), FIG. 13 shows the rail system 1 according to the subject matter disclosed herein in which successively more cover elements or flaps 8 are moved out of the first position I into the second position II and the respective levelling devices 12 are used to achieve a planar or flat upper surface of the rail system 1. In FIG. 13(f), the assembly rail or seat rail 2 of the rail system is completely covered by the cover elements 8. The levelling devices 12 are also being used here so that a substantially continuously flat and planar floor surface is formed.

Figure 14:
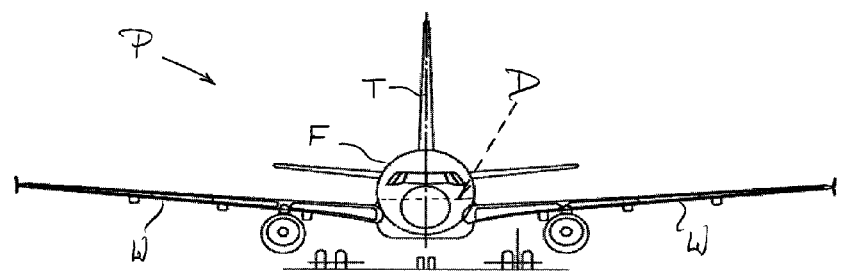
FIG. 14 is a front view of an aircraft which has a rail system according to an embodiment of the subject matter disclosed herein.

FIG. 14 shows an aircraft P comprising a fuselage F, wings W and a tail fin T. The structure of the fuselage F comprises at least one deck D which has a rail system 1 according to the subject matter disclosed herein for assembling or fastening seats, as described above with reference to FIGS. 1 to 13.

While at least one exemplary embodiment of the invention(s) described herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rail system comprising:
   an assembly rail;
   a first panel; and
   at least one cover element which is movable between a first position, in which the at least one cover element is received in a recess in the first panel or is arranged on the first panel, and a second position for covering the assembly rail,
   wherein an upper surface of the at least one cover element in the first position and in the second position is located substantially in a plane with an upper surface of the first panel.

2. The rail system according to claim 1, wherein, in the second position, the upper surface of the at least one cover element merges in a planar manner substantially smoothly into the upper surface of the first panel.

3. The rail system according to claim 1, wherein the at least one cover element is pivotable between the first position and the second position, or wherein the at least one cover element can be displaced between the first and second positions.

4. The rail system according to claim 3, wherein the at least one cover element is pivotable through an angle of up to and including 180°.

5. The rail system according to claim 1, wherein the first panel comprises a levelling device for levelling the upper surface of the first panel or for filling a recess in the first panel when the at least one cover element is in the second position.

6. The rail system according to claim 5, wherein the levelling device comprises a filler element which is movable out of a position, which is inactive, recessed, or inserted in the first panel, into a filling position when the at least one cover element is in the second position, wherein, in the filling position, an upper surface of the filler element is located substantially in the plane with the upper surface of the first panel.

7. The rail system according to claim 6, wherein the filler element is configured such that the filler element can be removed from and reintroduced into the position which is inactive, recessed, or inserted in the first panel and wherein the levelling device also comprises a sliding piece which is configured for lateral displacement so that the sliding piece is displaceable between a retracted position, next to the filler element located in the inactive, recessed, or inserted position, and an extracted position, when the filler element is moved into the filling position.

8. The rail system according to claim 1, wherein the at least one cover element is configured as a rigid or semi-rigid flap, tab, plate or sheet; and/or
   wherein the system comprises a holder mechanism by which the at least one cover element is held in at least one of the first and second positions; and/or
   wherein the at least one cover element is pretensioned into at least one of the first and second positions by a spring element.

9. The rail system according to claim 1, wherein the first panel has a plurality of cover elements which are arranged in a row one after another along and next to the assembly rail, wherein the assembly rail has a plurality of fastening points arranged at regular intervals, and wherein each of the plurality of cover elements is arranged in order to cover a respective fastening point.

10. The rail system according to claim 1, further comprising a second panel comprising a surface substantially in the plane with the upper surface of the first panel.

11. The rail system according to claim 10, wherein the second panel is a second floor panel for arrangement next to and substantially in parallel with both the assembly rail and the first panel on one side of the assembly rail opposite the first panel.

12. The rail system according to claim 1, wherein the assembly rail comprises a projection for supporting a peripheral region of the first panel and wherein the at least one cover element is attached to the peripheral region of the first panel.

13. The rail system according to claim 1, wherein the assembly rail comprises a duct for guiding a cabling system and wherein the at least one cover element also covers the duct in the second position.

14. The rail system according to claim 1, wherein the assembly rail is a seat rail for assembling or fastening a seat in an aircraft and wherein the first panel is a first floor panel for arrangement next to and substantially in parallel with the assembly rail.

15. An aircraft having a fuselage structure which comprises at least one deck which has a rail system comprising:
   an assembly rail;
   a first panel; and
   at least one cover element which is movable between a first position, in which the at least one cover element is received in a recess of the first panel or is arranged on the first panel, and a second position for covering the assembly rail, wherein an upper surface of the at least one cover element in the first position and in the second position is located substantially in a plane with an upper surface of the first panel.

16. A rail system comprising:

an assembly rail;

a first panel; and at least one cover element which is movable between a first position, in which the at least one cover element is received in a recess in the first panel or is arranged on the first panel, and a second position for covering the assembly rail, wherein an upper surface of the at least one cover element in the second position is located substantially in a plane with a surface of the first panel, wherein the first panel comprises a levelling device for levelling the surface of the first panel or for filling a recess in the first panel when the at least one cover element is in the second position.

* * * * *